(12) United States Patent
Nakanishi

(10) Patent No.: US 7,086,852 B2
(45) Date of Patent: *Aug. 8, 2006

(54) STACK INJECTION MOLDING APPARATUS WITH SEPARATELY ACTUATED ARRAYS OF VALVE GATES

(75) Inventor: Itsuto Nakanishi, Toronto (CA)

(73) Assignee: Mold-Masters Limited, Ontario (CA)

( * ) Notice: Subject to any disclaimer, the term of this patent is extended or adjusted under 35 U.S.C. 154(b) by 32 days.

This patent is subject to a terminal disclaimer.

(21) Appl. No.: 10/877,990

(22) Filed: Jun. 29, 2004

(65) Prior Publication Data

US 2004/0234645 A1 Nov. 25, 2004

Related U.S. Application Data

(63) Continuation of application No. 09/654,165, filed on Sep. 1, 2000, now Pat. No. 6,755,641.

(51) Int. Cl.
*B29C 45/22* (2006.01)

(52) U.S. Cl. ................ 425/564; 425/570; 425/572

(58) Field of Classification Search ............... 425/562, 425/564, 566, 570, 572, 573
See application file for complete search history.

(56) References Cited

U.S. PATENT DOCUMENTS

| | | | | |
|---|---|---|---|---|
| 2,865,050 A | 12/1958 | Strauss | ............... | 194/230 |
| 4,095,931 A | 6/1978 | Reitan | ............... | 425/564 |
| 4,212,627 A | 7/1980 | Gellert | ............... | 425/564 |
| 4,244,909 A | 1/1981 | Gellert | ............... | 264/297.2 |
| 4,330,258 A | 5/1982 | Gellert | ............... | 425/564 |
| 4,378,963 A | 4/1983 | Schouenberg | ............... | 425/144 |
| 4,586,887 A | 5/1986 | Gellert | ............... | 425/144 |
| 4,669,971 A | 6/1987 | Gellert | ............... | 425/549 |
| 4,712,995 A | 12/1987 | Basnett | ............... | 425/562 |
| 4,891,001 A | 1/1990 | Gellert | ............... | 425/549 |
| 4,917,594 A | 4/1990 | Gellert et al. | ............... | 425/549 |
| 4,923,387 A | 5/1990 | Gellert | ............... | 425/549 |
| 5,013,235 A | 5/1991 | Friderich | ............... | 425/564 |
| 5,066,216 A | 11/1991 | Kowtko et al. | ............... | 425/562 |
| 5,078,589 A | 1/1992 | Osuna-Diaz | ............... | 425/562 |
| 5,368,470 A | 11/1994 | Manner | ............... | 425/564 |
| 5,372,496 A * | 12/1994 | Taniyama | ............... | 425/556 |
| 5,460,510 A | 10/1995 | Gellert | ............... | 425/562 |
| 5,478,230 A | 12/1995 | McGrevy | ............... | 425/564 |
| 5,533,882 A | 7/1996 | Gessner et al. | ............... | 425/564 |
| 5,968,429 A | 10/1999 | Treece et al. | ............... | 264/102 |
| 5,980,236 A | 11/1999 | Gellert et al. | ............... | 425/549 |
| 6,183,239 B1 | 2/2001 | Belous | ............... | 425/564 |
| 6,755,641 B1 | 6/2004 | Nakanishi | ............... | 425/566 |

FOREIGN PATENT DOCUMENTS

| | | |
|---|---|---|
| DE | 37 33 363 | 4/1989 |
| DE | 42 30 758 | 3/1994 |
| DE | 42 31 270 | 3/1994 |
| DE | 199 43 797 A 1 | 3/2001 |
| JP | 97924 | 8/1989 |
| JP | 9-141888 | 8/1997 |
| JP | 202-096359 | 4/2002 |
| WO | WO 00/43187 | 7/2000 |

* cited by examiner

*Primary Examiner*—Duane Smith
*Assistant Examiner*—Emmanuel S. Luk
(74) *Attorney, Agent, or Firm*—Sterne, Kessler, Goldstein & Fox, P.L.L.C.

(57) ABSTRACT

A stack injection molding apparatus has first and second arrays of valve gate injection nozzles and separate mechanisms for independently actuating the nozzles of each array. A separate reciprocating yoke plate engages the valve pins of each nozzle array, and is actuated by either one centrally located actuator or a pair of symmetrically located actuators.

3 Claims, 11 Drawing Sheets

STACK INJECTION MOLDING APPARATUS WITH SEPARATELY ACTUATED ARRAYS OF VALVE GATES

CROSS-REFERENCE TO RELATED APPLICATIONS

This application is a continuation of U.S. application Ser. No. 09/654,165, filed Sep. 1, 2000 now U.S. Pat. No. 6,755,641.

This invention relates generally to stack injection molding and, more particularly, to a stack molding system having a plurality of valve gates commonly actuated by a uniform motion transferring mechanism.

BACKGROUND OF THE INVENTION

In multi-cavity stack injection molding systems, accurate control of resin melt flow from a hot runner manifold to all of the mold cavities is essential to achieving uniformity of the molded articles. The reciprocating valve pins used to control the gates to the cavities typically are operated simultaneously, which requires even loading of the valve pins. Compactness and simplicity of the machinery also are important considerations from the standpoint of cost, reliability and efficient heat transfer.

Representative examples of known stack injection molding systems are disclosed in U.S. Pat. Nos. 4,212,627; 4,244,909; 4,891,001; 5,013,235; 5,460,510; 5,478,230; and 5,533,882. Some of these employ a separate actuator for each valve pin, or a separate actuator for each opposed pair of valve pins. U.S. Pat. No. 4,212,627 discloses a stack molding arrangement wherein a single hydraulic actuator simultaneously moves all of the valve pins of two arrays of injection nozzles through a complex multi-link slide bar mechanism. This arrangement ensures simultaneous valve pin movement, but it tends to require frequent maintenance and does not permit any flexibility in operation, such as differential opening or closing of the two arrays of injection nozzles.

In single-face molding machines various arrangements are known for simultaneously actuating a single array of valve pins. See, for example, U.S. Pat. No. 4,095,931 (sliding cam rod); U.S. Pat. No. 4,330,258 and WO 00/43187 (rack and pinion drive); and JP 9141688 (reciprocating plate). Other valve pin actuating mechanisms are disclosed in U.S. Pat. No. 4,378,963; U.S. Pat. No. 4,669,971; U.S. Pat. No. 4,712,995; U.S. Pat. No. 4,917,594; U.S. Pat. No. 4,923,387; U.S. Pat. No. 5,368,470; DE 3733363; DE 4230758; and DE 4231270. However, the technology used in such arrangements has not been of much benefit to stack molding apparatus, which generally tend to be complex, cumbersome, expensive, subject to premature wear, and/or unreliable. A need exists, therefore, for an improved stack molding apparatus that is durable and compact, allows for flexibility of operation, and efficiently and reliably produces molded products of good quality.

SUMMARY OF THE INVENTION

The present invention overcomes many of the disadvantages of the prior art by providing, in one aspect, an injection molding apparatus comprising a first array of injection nozzles and a second array of injection nozzles, each nozzle having a melt channel and a valve pin movable within the melt channel to open and close a mold gate. A melt distribution manifold is located between the first and second arrays of injection nozzles and is in fluid communication with the arrays of nozzles. Separate actuating assemblies are provided, one for displacing the valve pins of the first array of injection nozzles and another for displacing the valve pins of the second array of injection nozzles. Each actuating assembly comprises at least one actuator and a common linkage element driven by the actuator and linked to all of the valve pins of its respective array of injection nozzles to move the valve pins in unison.

In another aspect the invention provides an injection molding apparatus comprising an array of injection nozzles, and a melt distribution manifold in fluid communication with the array of injection nozzles. Each nozzle has a melt channel and a valve pin movable within the melt channel; and each valve pin has a driven portion and a tip end that controls melt flow through a mold gate. An actuating assembly for displacing the valve pins of the array of injection nozzles comprises at least one actuator and a common linkage element driven by the actuator and linked to the driven portions of all of the valve pins of the array of injection nozzles to move the valve pins in unison, the actuator being located between the common linkage element and the tip ends of the valve pins.

Further objects and advantages of the invention will appear from the following detailed description taken together with the accompanying drawing figures.

DETAILED DESCRIPTION OF THE INVENTION

Figure 1:
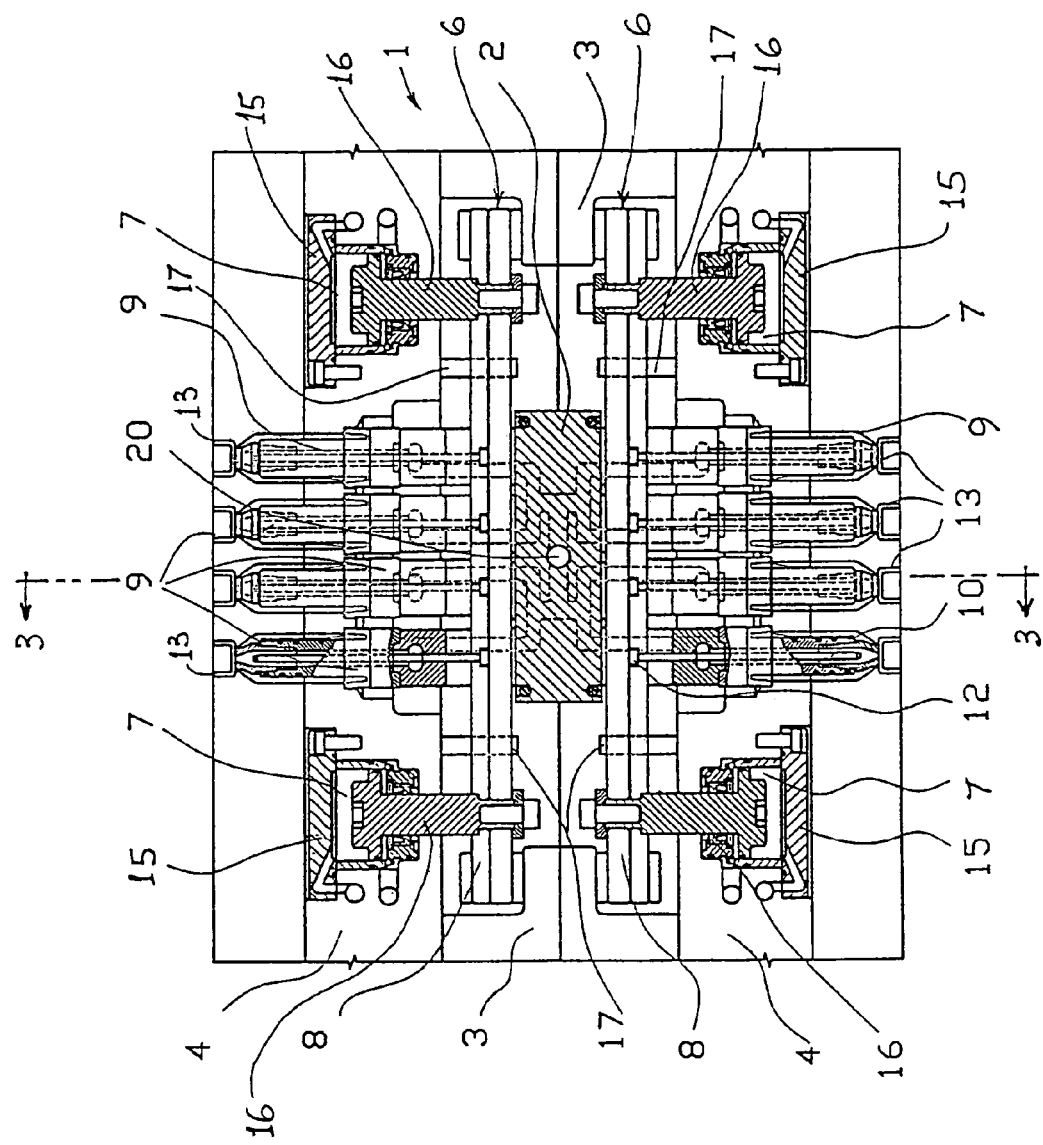
FIG. 1 is a partial sectional view of a portion of a multi-cavity stack molding system according to a first embodiment of the invention, showing the valve pins in the open position.

Reference is first made to FIG. 1 which shows a portion of a stack mold assembly 1 comprising a stationary, elongated and heated melt distribution manifold 2 having a central melt bore 20. Backing plates 3 surround manifold 2 and tightly abut one another. Above and below backing plates 3 are nozzle plates 4, each of which houses a plurality of valve gate nozzles 9 (here, four nozzles in a single row) mounted in separate nozzle bushings 21.

Figure 3:
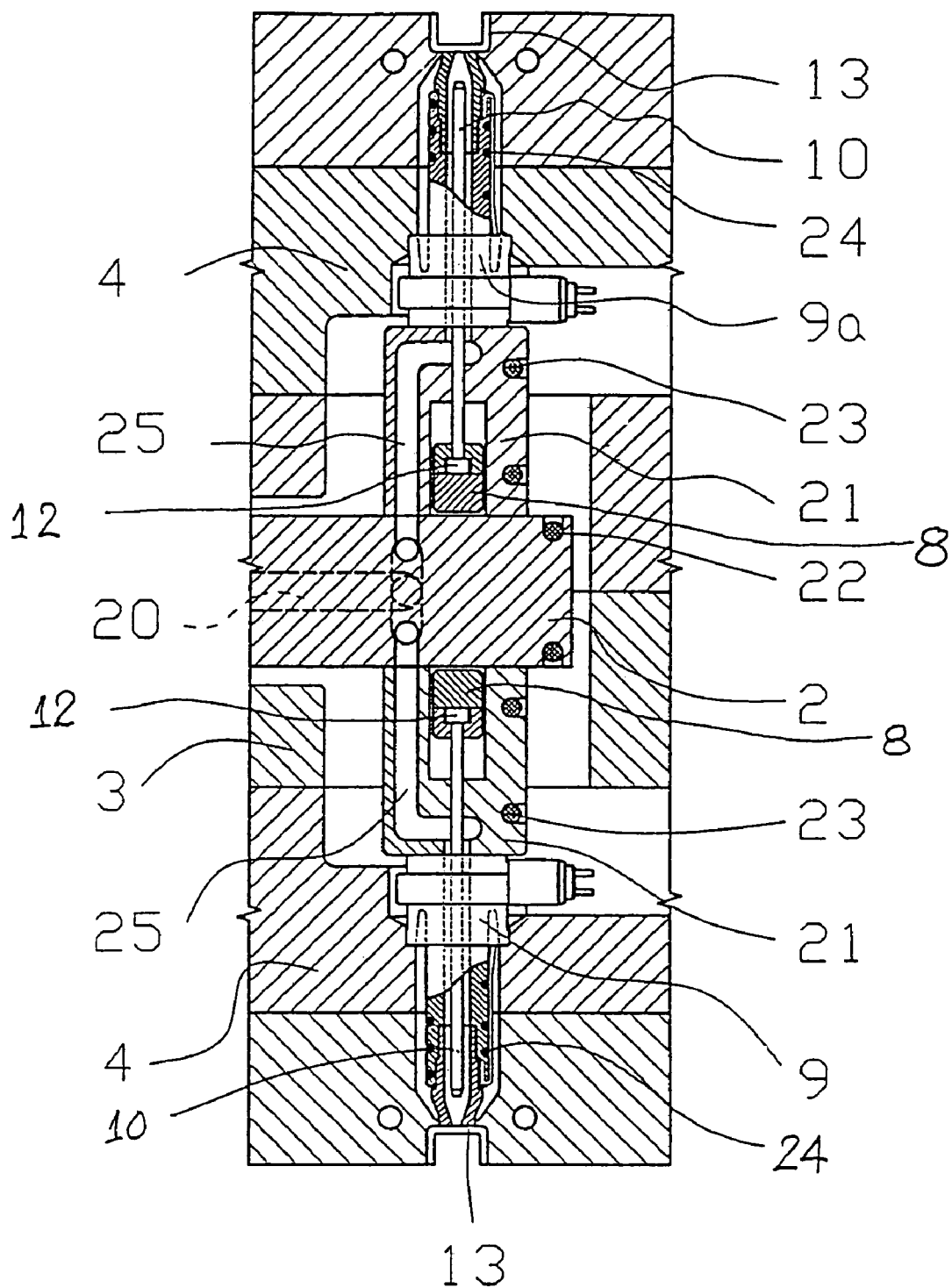
FIG. 3 is an enlarged sectional view, taken along line 3—3 in FIG. 1, of a portion of the stack molding system of FIG. 1, showing the valve pins in the open position.
Figure 4:
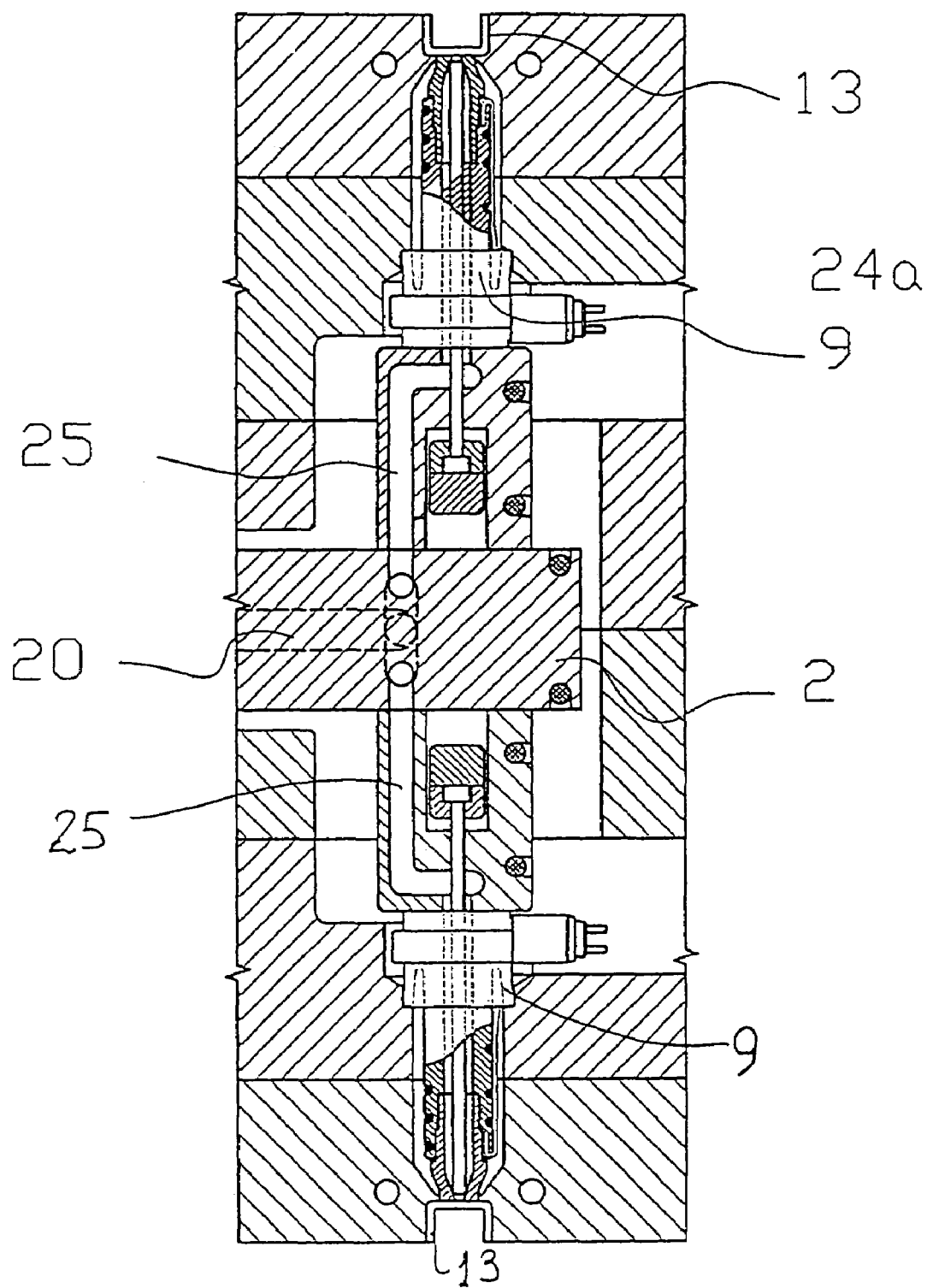
FIG. 4 is view similar to FIG. 3, taken along line 4—4 in FIG. 2, showing the valve pins in the closed position.

Referring to FIGS. 1 and 3, each valve gate nozzle 9 has a melt bore 10a that communicates at its outer (gated) end with a mold cavity 13, and at its inner end with central melt bore 20 in manifold 2 via a branch melt passage 25 in nozzle bushing 21. To keep the resin melt heated and thus insure that it flows from central melt bore 20 through each nozzle 9 to each cavity 13, electric heaters 22, 23, 24 are provided, respectively, in manifold 2, each nozzle bushing 21 and the body of each nozzle 9. Each valve gate nozzle 9 has a single valve pin 10 with a head 12. The front end of the pin 10, i.e., the end adjacent the gate, controls melt flow through the gate.

Nozzle plates 4 also house actuating assemblies 6. Each actuating assembly 6 comprises two double-acting hydraulic actuators 7 that flank the array of valve gate nozzles 9 that they actuate, each having a cap 15 at its outer end and driving a rod 16 at its inner end which extends from the internal piston of the actuator. A yoke plate 8 is disposed between manifold 2 and each array of valve gate nozzles 9, and is linked to rods 16 of the adjacent actuators 7. The heads 12 of valve pins 10 are engaged with their adjacent yoke plates 8. Movement of each yoke plate 8 by actuators 7 thus simultaneously moves the adjacent array of valve pins 10 between open and closed positions. Spacers 11 fixed to the ends of yoke plates 8 serve as stops for the yoke plates. The arrangement of actuators 7 and yoke plates 8 is symmetrical so that the forces applied by the actuators are evenly distributed.

Figure 11:
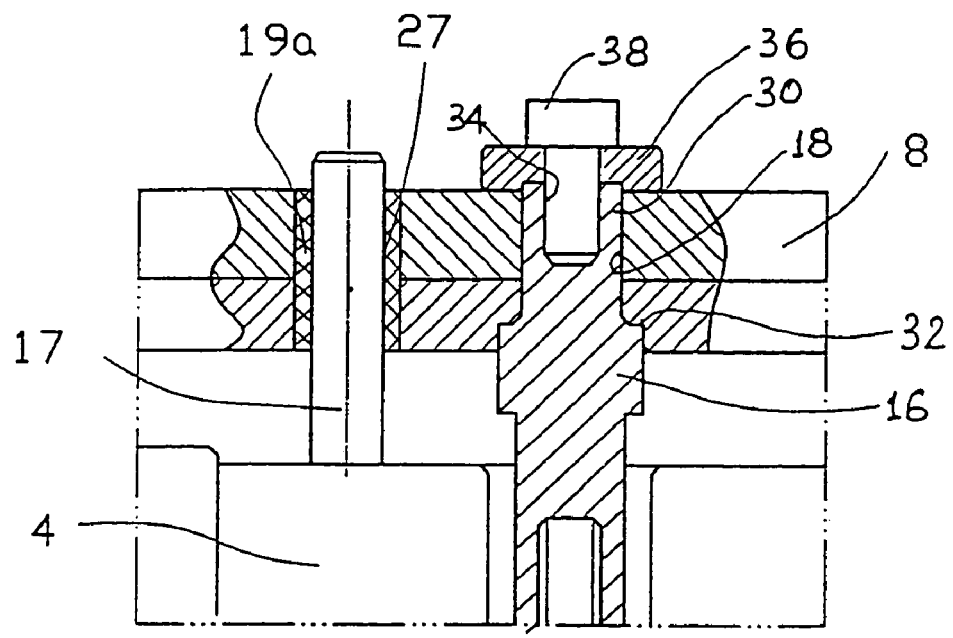
FIG. 11 is a detail sectional view of guiding and attachment elements useful in all of the above embodiments of the invention.

FIG. 11 shows details of the connection of yoke plates 8 to rods 16, and the structure for guiding the yoke plates. Each rod 16 has a terminal portion 30 with a shoulder 32 and an internally threaded bore 34. Terminal portion 30 mates with a similarly shaped hole 18 in yoke plate 8. A washer 36 and a cap bolt 38 tightly secure yoke plate 8 to rod 16 so that they move as a unit.

Figure 12:
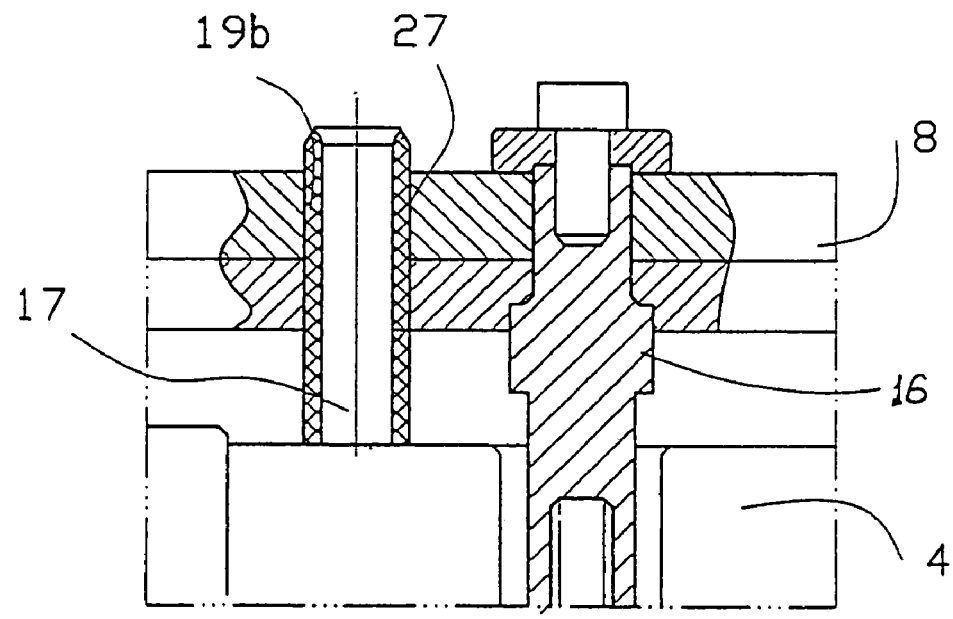
FIG. 12 is a detail sectional view of an alternate form of guiding elements useful in all of the above embodiments of the invention.

Referring further to FIG. 11, each yoke plate 8 is guided by a plurality of guide pins 17 that are fixed to nozzle plates 4 and extend through holes 27 in the yoke plate. Guide pins 17 and holes 27 preferably have circular cross-sections, but other cross-sections may be used as long as they allow for a close sliding fit. An anti-friction element in the form of a bushing 19a lines each hole 27 such that there is a smooth sliding fit between pins 17 and holes 27. FIG. 12 shows an alternate arrangement wherein the anti-friction element is in the form of a sleeve carried on the outside of each pin 17. Either arrangement smoothly and evenly guides the yoke plates 8 under the action of actuators 7, preventing warping of the yoke plates 8 and insuring uniform loading of the valve pins 10.

The anti-friction elements between pins 17 and holes 27 in yoke plates 8 can be made of any thermally stable, low-friction polymer. Examples include polyamide or polytetrafluoroethylene (PTFE); or a composite polymeric composition, for example, metalfluoroplastic material; or a low-friction alloy, for example, sintered bronze. It is also possible to use a wear-resistant solid lubricating coating, for example, a polymeric, ceramic or hard metal coating capable of stable operation under conditions normally encountered during the injection molding process, and also capable of being fused either on the outside of pins 17 or on the inside of holes 27.

Figure 2:
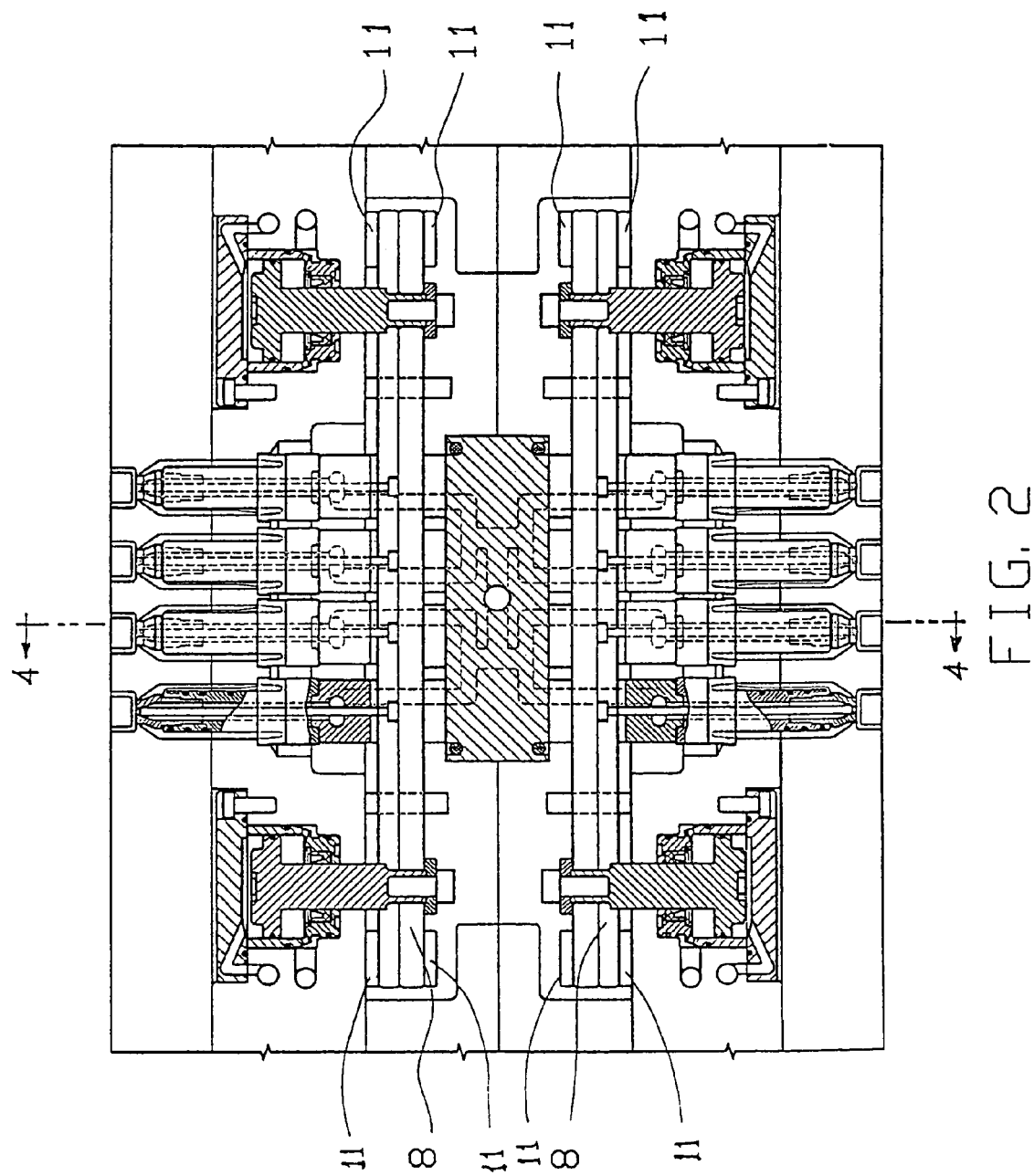
FIG. 2 is a partial sectional view of the stack molding system of FIG. 1, showing the valve pins in the closed position.

In use, a controlled external source of hydraulic fluid (not shown) connected to actuators 7 drives each linked pair of actuators in the same direction as required during the molding operation. FIG. 1 shows all of the valve gates in the open position, which allows resin melt to flow into all mold cavities 13. When the cavities are filled with resin, hydraulic pressure applied below the pistons of upper actuators 7 causes upper rods 16 to move upwardly and carry with them upper yoke plate 8, thus moving upper valve pins 10 upwardly in unison to close the upper valve gates and stop melt flow. Similarly, hydraulic pressure applied above the pistons of lower actuators 7 causes lower rods 16 to move downwardly and carry with them lower yoke plate 8, thus moving lower valve pins 10 downwardly in unison to close the lower valve gates and stop melt flow. The closed configuration is depicted in FIG. 2. After the molded articles are removed and it is desired to resume melt flow into the cavities 13, the process is reversed to open all of the valve gates, returning to the configuration of FIG. 1.

FIGS. 1 and 2 demonstrate that both arrays of valve gate nozzles are actuated simultaneously, all being either open or closed at the same time. In other words, melt injection occurs simultaneously through all of the valve gates. If desired, each array of valve gate nozzles may be independently controlled by a suitable hydraulic controller that would independently direct pressurized hydraulic fluid as desired to the pair of actuators 7 of each array of nozzles. Thus the gates of one array of nozzles may be held open to allow melt flow while the gates of the other array may be held closed to block melt flow.

Figure 5:
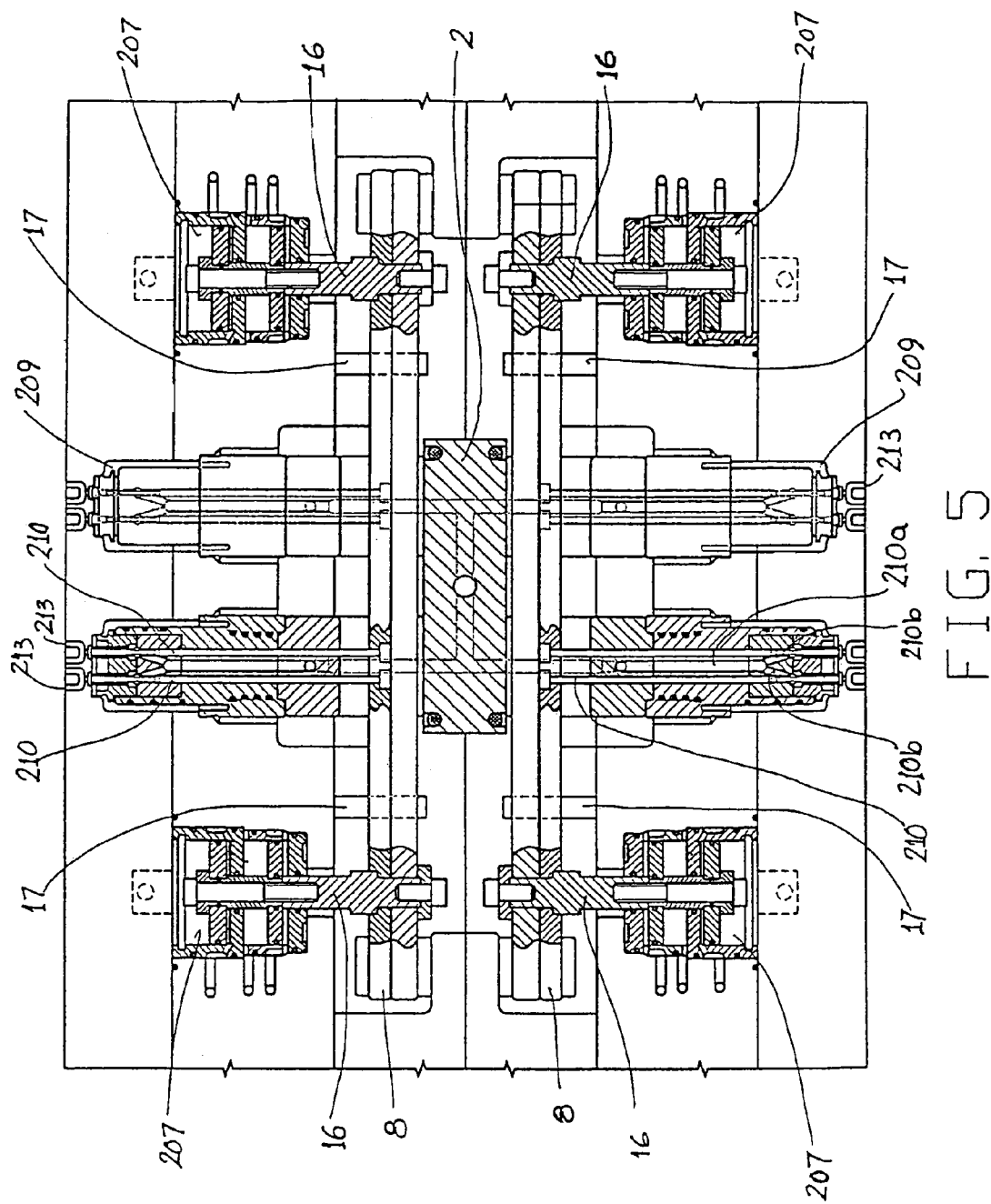
FIG. 5 is a partial sectional view of a portion of a multi-cavity stack molding system according to a second embodiment of the invention, showing the valve pins in the open position.
Figure 6:
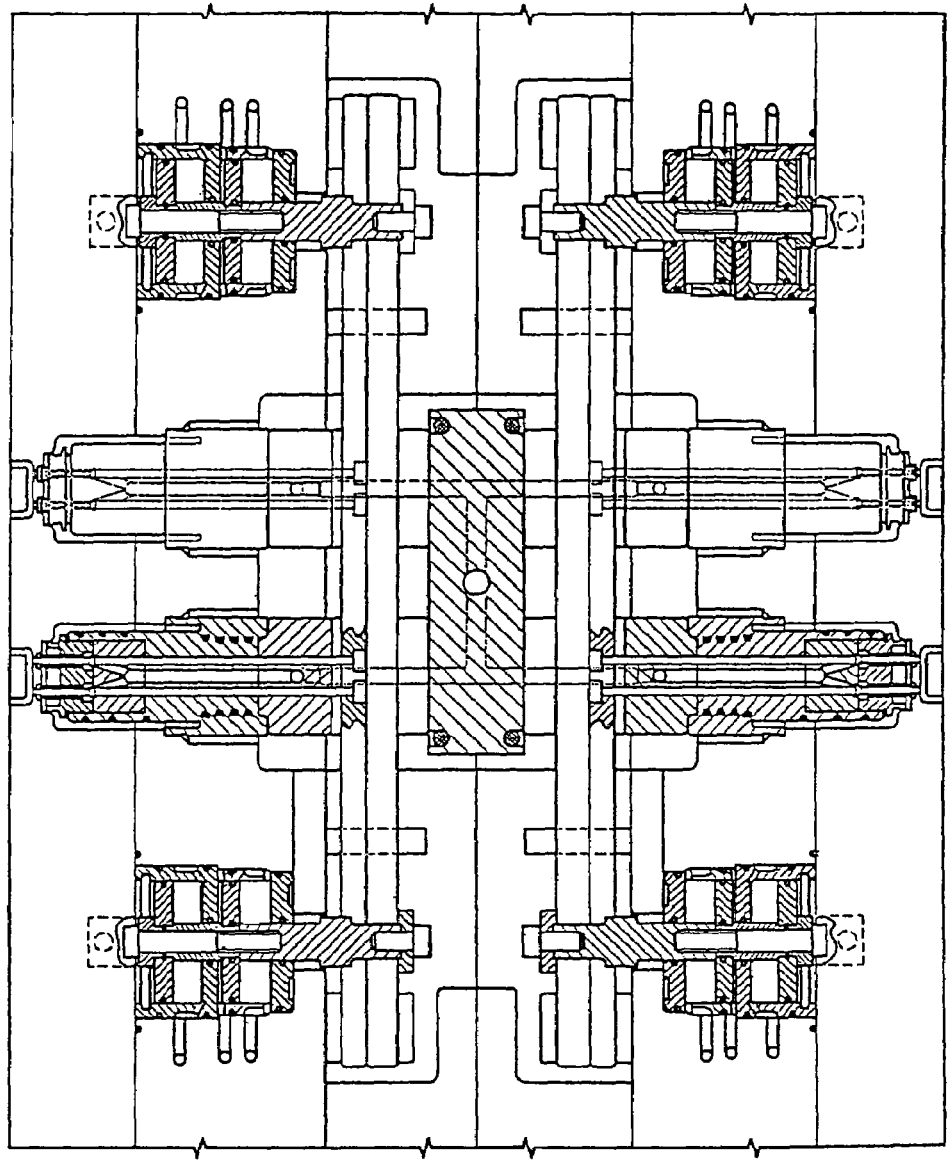
FIG. 6 is a partial sectional view of the stack molding system of FIG. 5, showing the valve pins in the closed position.

A second embodiment of the invention is depicted in FIGS. 5 and 6. This embodiment has a layout similar to the first embodiment (like parts are denoted by like reference numerals), but movement of yoke plates 8 is effected by two-cylinder double-acting pneumatic actuators 207, instead of hydraulic actuators. Also, each heated valve gate nozzle 209 houses a plurality of valve pins 210, a central melt bore 210a and branch melt bores 210b which feed separate mold cavities 213. Of course, pneumatic actuators can be used in a stack mold arrangement having valve gate nozzles with single valve pins.

Figure 7:
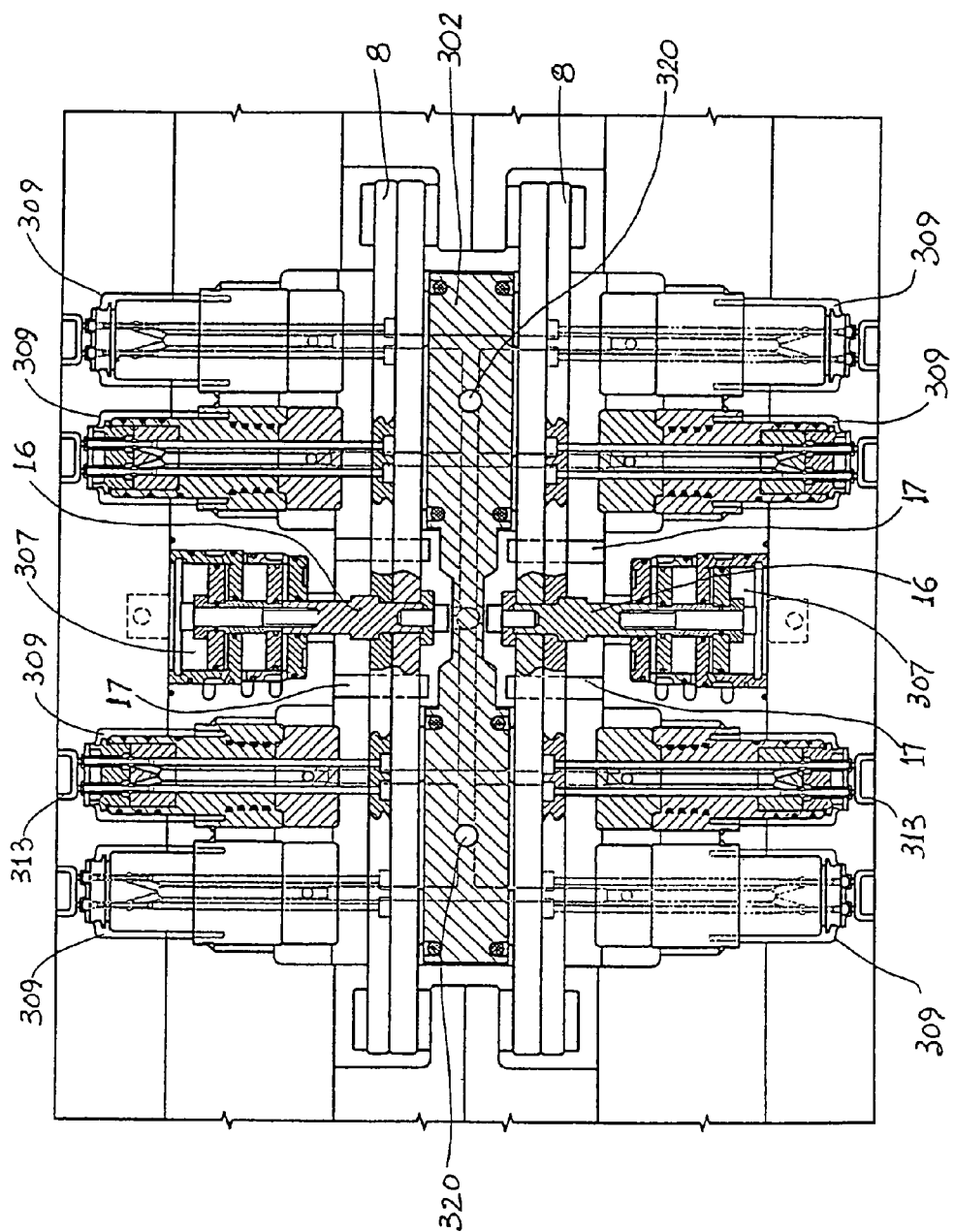
FIG. 7 is a partial sectional view of a portion of a multi-cavity stack molding system according to a third embodiment of the invention.

FIG. 7 depicts a third embodiment of the invention, in which like parts are denoted by like reference numerals. Here, a more elongated heated melt distribution manifold 302 has a plurality of central melt bores 320 that communicate with plural-pin heated valve gate nozzles 309, each of which feeds a single local mold cavity 313. Movement of each yoke plate 8 is effected by a single centrally located, two-cylinder, double-acting pneumatic actuator 307. Of course, centrally located pneumatic actuators can be used in a stack mold arrangement having valve gate nozzles with single valve pins.

Figure 8:
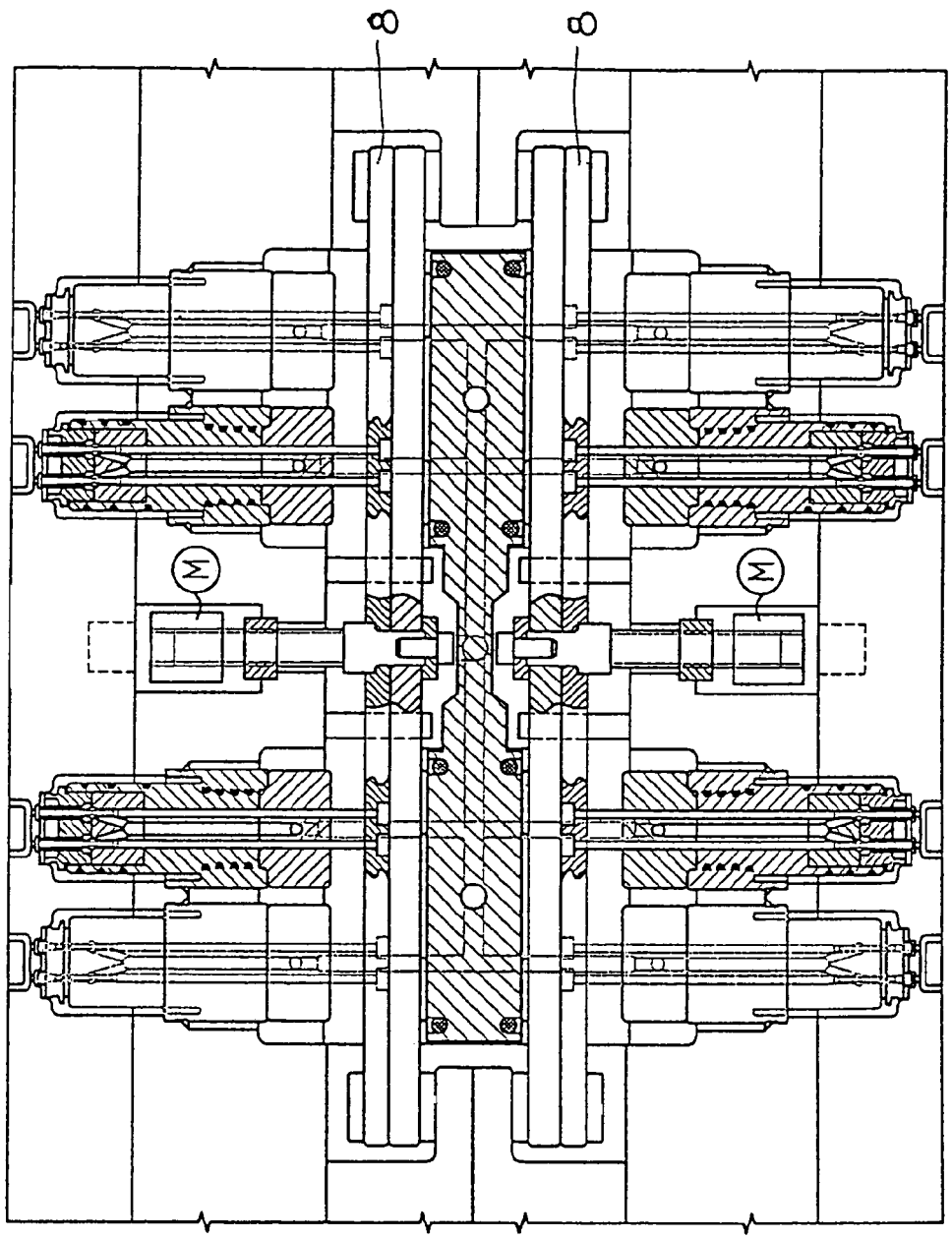
FIG. 8 is a partial sectional view of a portion of a multi-cavity stack molding system according to a fourth embodiment of the invention.

FIG. 8 depicts a fourth embodiment of the invention which is identical to the embodiment of FIG. 7 (like parts are denoted by like reference numerals), except that conventional reversing electric motor actuators M effect movement of yoke plates 8.

Figure 9:
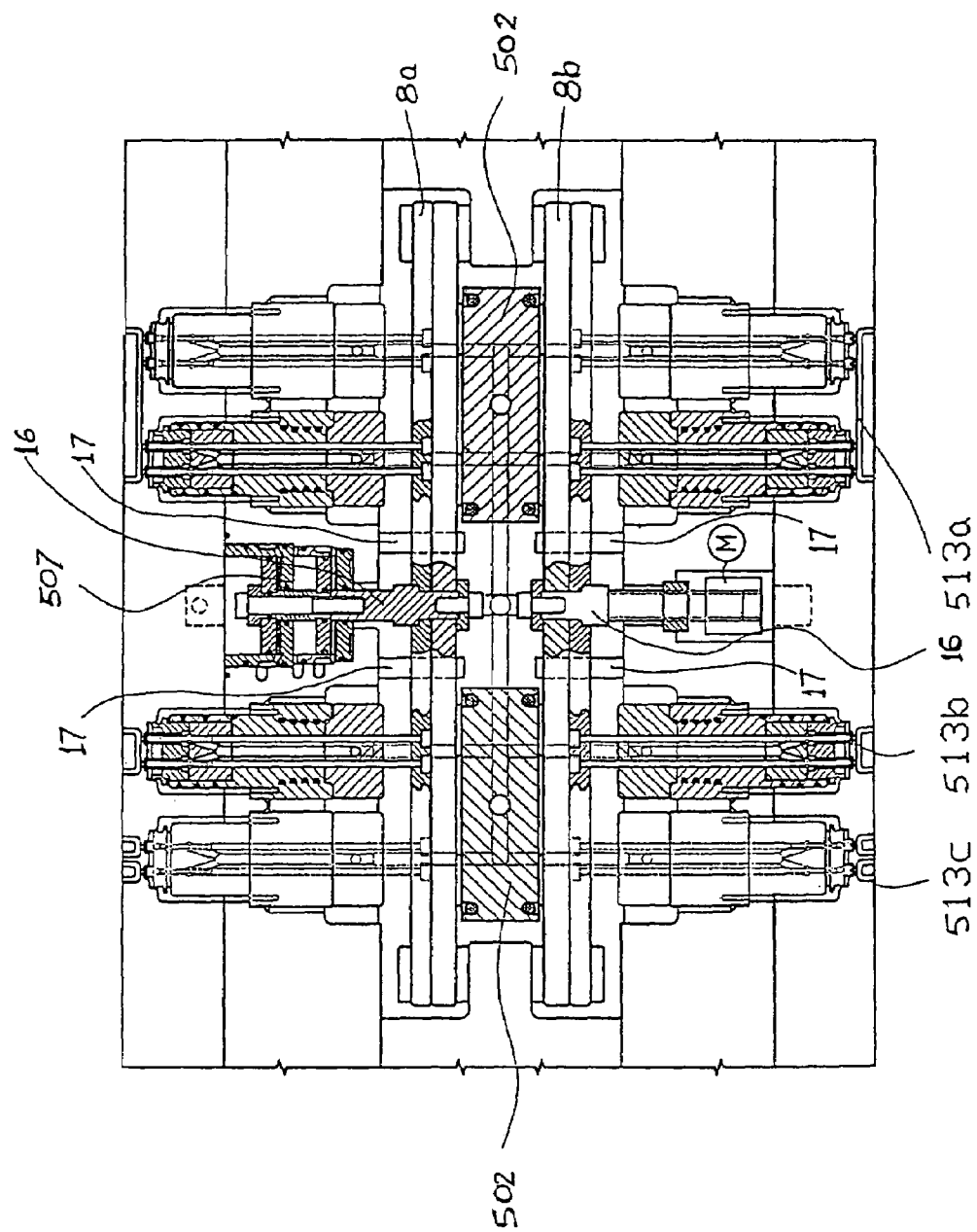
FIG. 9 is a partial sectional view of a portion of a multi-cavity stack molding system according to a fifth embodiment of the invention.

FIG. 9 depicts a fifth embodiment of the invention that is similar to the embodiment of FIG. 7 (like parts are denoted by like reference numerals). However, movement of the upper yoke plate 8a is effected by a two-cylinder, double-acting pneumatic actuator 507, while movement of lower yoke plate 8*b* is effected by a reversing electric motor actuator M. Also, two separate heated melt distribution manifolds 502 are used. Further, melt feed to various mold cavity configurations is illustrated. Specifically, the right side of FIG. 9 shows an arrangement wherein the four branch melt bores of two heated valve gate nozzles feed a single large mold cavity 513*a*; to the left of that the two branch melt bores of a single heated valve gate nozzle feed a single smaller mold cavity 513*b*; and to the left of that the individual branch melt bores of a single heated valve gate nozzle feed individual smaller mold cavities 513*c*.

Figure 10:
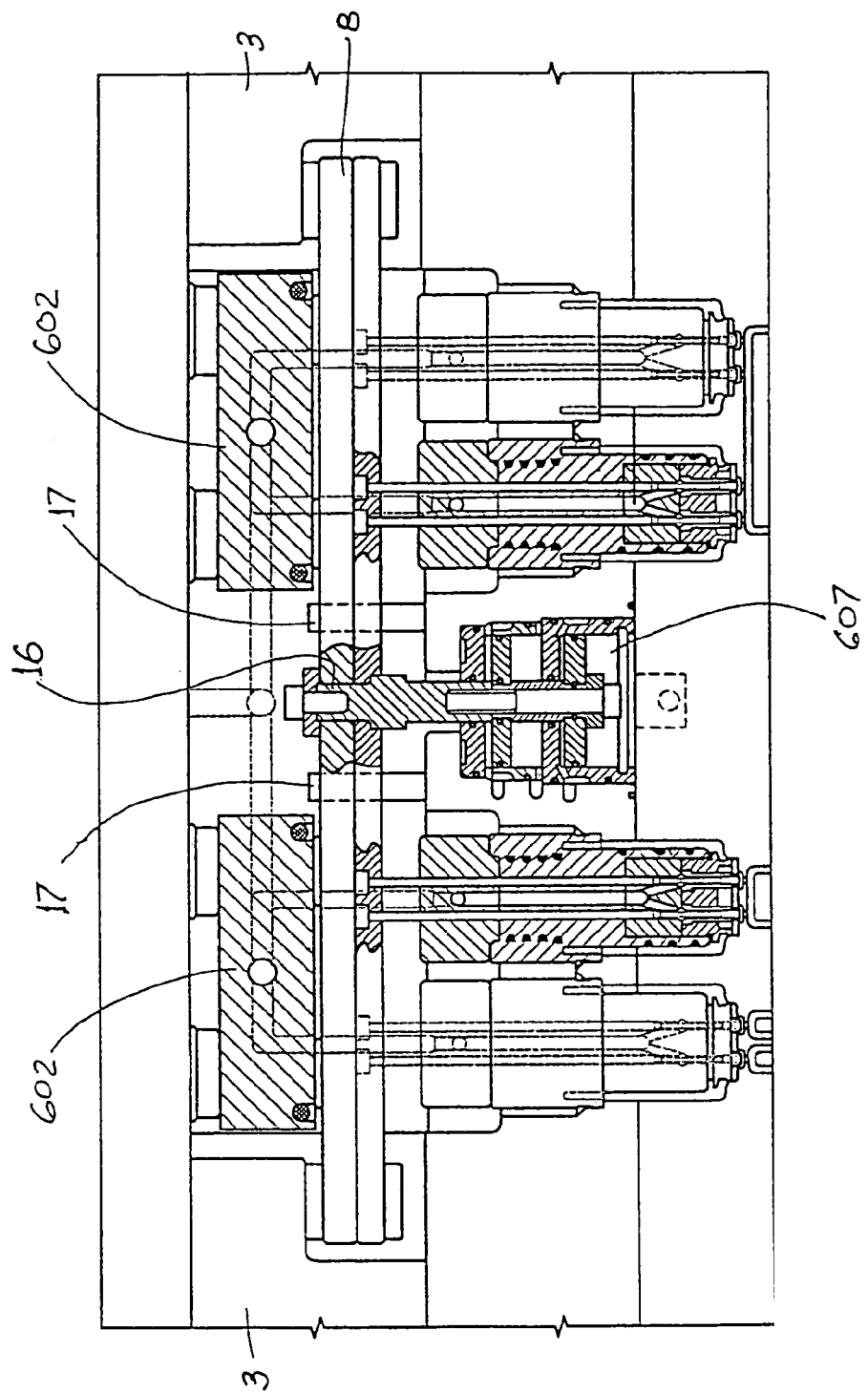
FIG. 10 is a partial sectional view of a portion of a multi-cavity single-face molding system embodying some of the features of the invention.

FIG. 10 illustrates how some of the features of the invention can be incorporated in a multi-cavity single-face molding system (like parts are denoted by like reference numerals). This embodiment essentially is the lower half of the embodiment of FIG. 9, i.e., the upper yoke plate 8*a* of FIG. 9 and all structure above it has been eliminated. A single two-cylinder, double-acting pneumatic actuator 607 is shown, but a reversing electric motor actuator (as per FIG. 9) may be used instead.

From the above it will be appreciated that the invention affords flexibility in construction and operation of a molding apparatus that is durable and relatively compact, and operates efficiently and reliably. While the features of the invention have been described in the context of one or more preferred embodiments, it will be evident that various modifications are possible without departing from the scope of the invention as understood by those skilled in the art and as defined by in the following claims.

The invention claimed is:

1. A stack injection molding apparatus comprising:
an injection manifold having a melt inlet, a plurality of first melt outlets and a plurality of second melt outlets;
a first plurality of hot runner nozzles in communication with said first plurality of melt outlets facing a first plurality of mold cavities, wherein said first plurality of mold cavities are located on a first mold plate, wherein at least one of said first plurality of hot runner nozzles includes a plurality of valve pins movable within the hot runner nozzle;
a second plurality of hot runner nozzles in communication with said second plurality of melt outlets facing a second plurality of mold cavities, wherein said second plurality of mold cavities are located on a second, movable mold plate, wherein at least one of said second plurality of hot runner nozzles includes a plurality of valve pins within the hot runner nozzle;
a first actuator connected to the plurality of valve pins movable in said at least one nozzle of said first plurality of hot runner nozzles; and
a second actuator connected to the plurality of valve pins movable in said at least one nozzle of said second plurality of hot runner nozzles,
wherein the injection manifold is located between said first and said second actuators.

2. A stack injection molding apparatus according to claim 1, wherein said first and second actuators are pistons.

3. A stack injection molding apparatus according to claim 1, wherein said first and second actuators independently move said first and said second plurality of valve pins.

* * * * *